Sept. 9, 1924.
C. G. WOOD
CLUTCH PULL COLLAR
Filed July 18, 1921
1,507,805
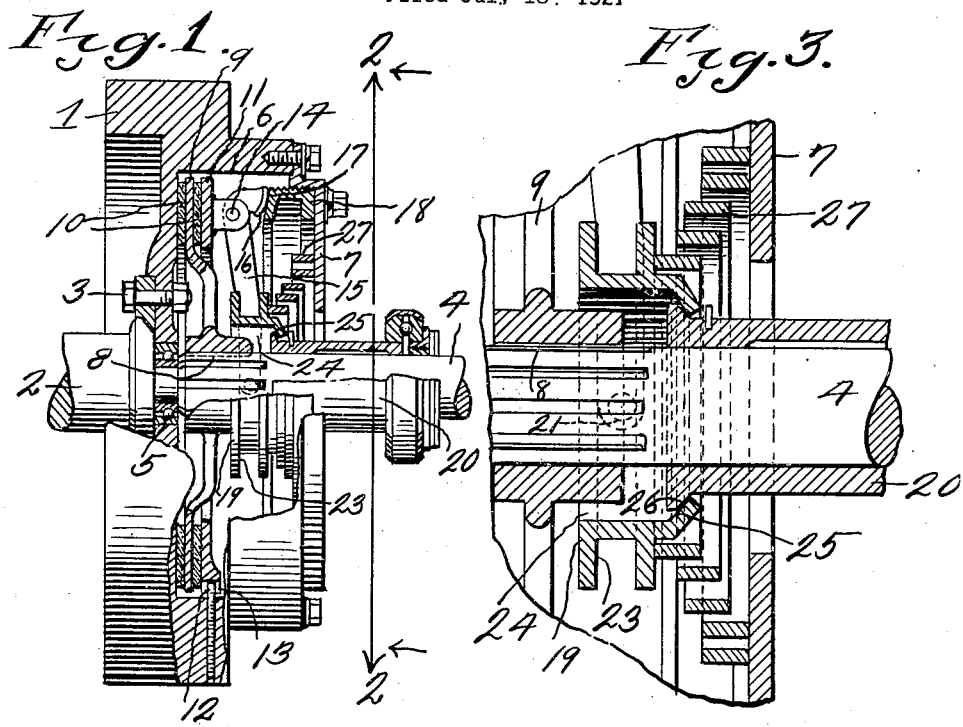
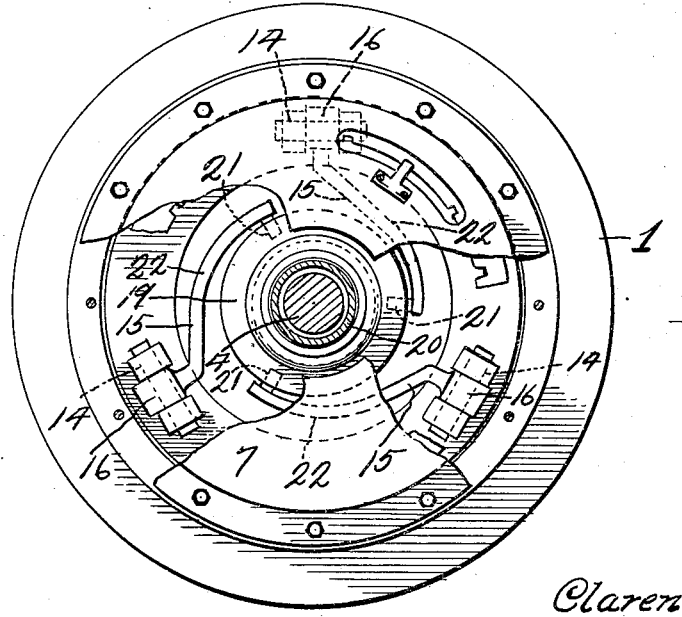
Inventor
Clarence G. Wood
By George J. Oltsch
Attorney Patented Sept. 9, 1924.

1,507,805

UNITED STATES PATENT OFFICE.

CLARENCE G. WOOD, OF MUNCIE, INDIANA, ASSIGNOR TO HOOSIER CLUTCH COMPANY, OF MUNCIE, INDIANA, A CORPORATION OF INDIANA.

CLUTCH-PULL COLLAR.

Application filed July 18, 1921. Serial No. 485,638.

*To all whom it may concern:*

Be it known that I, CLARENCE G. WOOD, a citizen of the United States, residing at Muncie, in the county of Delaware and State of Indiana, have invented certain new and useful Improvements in Clutch-Pull Collars, of which the following is a specification.

The invention relates to clutch pull collars and has for its object to provide a device of this character, particularly adapted for use in connection with a clutch comprising a driving and a driven member, which members are clutched together by means of an annular clamping ring loosely mounted in one of the clutch elements and controlled by levers carried by said ring, said levers having their ends in engagement with an annular channel carried by the pull collar. Also to loosely mount the said pull collar on one end of a slidable releasing sleeve whereby misalignment of the driven element or releasing sleeve, or clamping plate will be automatically taken care of to cause the levers to equally bear against an adjusting ring carried by the driving element.

A further object is to provide a pull collar having an annular channel for the reception of the inner ends of clamping levers, said pull collar having a cylindrical chamber therein, terminating at its outer end in a cone shaped surface cooperating with a cone shaped surface carried by the inner end of the releasing sleeve.

A further object is to provide in combination with a clutch operated through the medium of a clamping plate having pivoted levers provided with cam surfaces cooperating with surfaces carried by one of the elements of the clutch, a pull collar loosely mounted and engaged by the inner ends of the pivoted levers, said clamping plate and levers being loosely disposed within the clutch and the pull collar so constructed that misalignment of the clamping plate will be automatically taken care of during a clutch operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a view partly in section and partly in side elevation of the clutch, showing the pull collar applied thereto.

Figure 2 is a sectional view taken on line 2—2 of Figure 1, showing part of the casing broken away to better illustrate the structure.

Fig. 3 is an enlarged detail sectional view through a portion of the releasing sleeve, the pull collar and adjacent parts of the clutch.

Referring to the drawings, the numeral 1 designates a fly wheel and 2 a drive shaft to which said fly wheel is connected, by means of bolts 3. Disposed in axial alignment with the drive shaft 2 is a driven shaft 4, the inner end of which is rotatably mounted in an anti-friction bearing 5, said shafts 2 and 4 being capable of independent rotation. The fly wheel 1 is provided with a chamber 6 which is housed in a removable cover 7, which cover houses the clutch mechanism hereinafter set forth. Splined to the inner end of the driven shaft 4 as at 8 is a driven plate 9, which driven plate is disposed between friction discs 10 and is adapted to be clamped between said discs when the clutch elements are clutched together. Disposed within the chamber 6 is an annular champing plate 11, which plate is loosely mounted within the chamber 2 and guided in its movement by means of a stud 12 cooperating with a slot 13 in the clamping plate. It will be seen that there is considerable looseness of play of the clamping plate thereby allowing a uniform clamping during a clutching operation. Pivoted at 14 between spaced lugs carried by the clamping plate 11, are clamping levers 15, said clamping levers being provided with cams 16, which cooperate with a surface 17 carried by an adjusting ring 18. It will be seen that the clamping plate 11 and its clamping levers are floatably mounted within the chamber 6, and that when the cams 16 are forced into engagement with the surface 17 of the adjusting ring 18, that the clamping plate will exert a uniform pressure on the driven plate and friction discs throughout its entire circumference. Under these conditions it will be seen that it will be necessary to provide a pull collar 19, which pull collar is so constructed and connected to the releasing sleeve 20, that it will automatically accommodate itself during a clutch operation to the position of the inwardly extending lugs 21 carried by the ends of the curved arms 22 of the clamping levers, which lugs are disposed in the annular channel 23 of the pull collar. The pull collar surrounds the driven shaft 4 and has a cylindrical chamber 24, the outer end of which terminates in a cone shaped wall 25, which wall is engaged by the similarly shaped surface 26 of the releasing sleeve 20. The cone shaped engaging surfaces 25 and 26 allow looseness of play of the pull collar 19 under the influence of the clamping lever arms 22 so that said pull collar will automatically overcome misadjustment of the driven shaft 4, or clamping plate 11, which misadjustment will be automatically taken care of because the cams 16 of the levers will be caused to equally bear against the surface 17 of the adjusting ring 18 when said pull collar is forced inwardly under the influence of the coiled spring 27.

From the above it will be seen that a pull collar is provided for operating clutch levers, said pull collar being loosely mounted, thereby allowing said levers and the clamping plate which they actuate to uniformly and automatically adjust themselves according to positions of the engaging surfaces.

The invention having been set forth what is claimed as new and useful is:—

The combination with a clutch operable through the medium of pivoted levers having lugs circumferentially arranged and spaced from each other, of an annular pull collar having an annular channel therein in which said lugs are received, said channel being formed by spaced flanges, said pull collar being provided with a flange having a bevelled surface, a releasing sleeve provided with a bevelled surface engaging the first mentioned bevelled surface, a coiled spring having its inner convolution surrounding the pull collar in engagement with one of the spaced flanges and spaced from the periphery of the collar, said bevelled surfaces and spaced relation of the inner convolution of the spring forming means whereby the pull collar will be allowed to automatically accommodate itself to the position of the lugs carried by the pivoted levers.

In testimony whereof I affix my signature.

CLARENCE G. WOOD.